2,942,022

CHLOROTRICYANOETHYLENE AND PROCESS OF PREPARATION

Clifford Lee Dickinson, Jr., Wilmington, Del., assignor to E. I. du Pont de Nemours and Company, Wilmington, Del., a corporation of Delaware No Drawing. Filed Aug. 6, 1958, Ser. No. 753,424

4 Claims. (Cl. 260—465.7)

This invention relates to chlorotricyanoethylene and to its preparation.

Ethylenic compounds containing one or more cyano groups have achieved considerable importance in recent years. Those containing not over two cyano groups are employed for the preparation of polymeric materials. Ethylene having all the hydrogens replaced by cyano groups is of more importance as an intermediate for the preparation of cyano containing heterocycles and dyes.

There has now been obtained the new compound chlorotricyanoethylene. The compound is prepared by chlorination of tricyanoethylene, followed by dehydrochlorination of the resultant 1,2-dichloro-1,1,2-tricyanoethane. The dehydrochlorination is effected using an acid acceptor, e.g., a tertiary amine. The tricyanoethylene is suitably prepared by brominating 1,1,2-tricyanoethane and treating the resulting 1-bromo-1,1,2-tricyanoethane with a tertiary amine to give the desired tricyanoethylene.

Chlorine attached to one of the carbons of a carbon-to-carbon double bond is usually considered inert. Surprisingly, the chlorine of chlorotricyanoethylene reacts with hydrogen bearing amines to give N-tricyanovinylamines, and with a tert-aromatic amine to introduce the tricyanovinyl group in the aryl ring.

The following examples further illustrate the preparative routes to and reactions of chlorotricyanoethylene.

EXAMPLE I

A. 1,1,2-tricyanoethane

Approximately 405 g. of concentrated ammonium hydroxide (specific gravity, 0.90) was placed in a reaction vessel and cooled to $-5°$ C. and 250 g. of $\alpha$-carboethoxysuccinonitrile was added with stirring at a rate such that the temperature of the reaction mass did not rise above $5°$ C. The mixture was stirred for 4.5 hours and filtered. The precipitate was collected, washed thoroughly with water and dried. There was obtained 143 g. of $\alpha$-carbamoylsuccinonitrile which, after crystallization from water, melts at $130-132.5°$ C. Analytical data:

Calc'd. for $C_5H_5N_3O$: C, 48.78; H, 4.07; N, 34.15. Found: C, 48.78; H, 3.97; N, 34.10.

A mixture of 73.8 g. of $\alpha$-carbamoylsuccinonitrile, 100 g. of sodium chloride and about 234 g. of acetonitrile was stirred for 5 minutes, after which 49.2 g. of phosphorus oxychloride was added carefully. The resulting mixture was stirred and heated under reflux for 9 hours. The solution was cooled and filtered and the precipitate was washed with acetonitrile. The solvent was evaporated and the solid was crystallized from water. There was obtained 50.5 g. of 1,1,2-tricyanoethane which melts at $112.0-113.5°$ C.

Analysis.—Calc'd. for $C_5H_3N_3$: C, 57.14; H, 2.86; N, 40.00. Found: C, 57.25; H, 2.82; N, 40.22.

B. 1-bromo-1,1,2-tricyanoethane

To a stirred, ice-cooled mixture of 5.25 g. (0.05 mole) of 1,1,2-tricyanoethane in 50 ml. of water there were added 8.00 g. (0.05 mole) of bromine dropwise. After 50 minutes the precipitate was collected, washed with water, and dried under vacuum over $P_2O_5$. The yield was 7.92 g. (85%). A sample was recrystallized in a benzene-chloroform mixture and then resublimed for analysis.

Analysis.—Calc'd. for $C_5H_2N_3Br$: C, 32.61; H, 1.09; N, 22.83; Br, 43.48. Found: C, 32.94; H, 0.99; N, 23.38; Br, 43.26, 43.48.

C. Tricyanoethylene

To a stirred, cooled solution of 18.50 g. (0.10 mole) of 1-bromo-1,1,2-tricyanoethane in 100 ml. of ether there were added 9.50 g. (0.094 mole) of triethylamine in 50 ml. of ether dropwise over a 20-minute period. The solution was stirred for five minutes and filtered and concentrated to about 60 ml. in a stream of nitrogen. This solution was chromatographed over about 60 g. of alumina and 200 ml. of ether was collected. Upon evaporation there was obtained an oily, yellow solid that was sublimed. Resublimation gave 7.1 g. (69%) of tricyanoethylene based upon bromotricyanoethane, M.P. $43-44.5°$ C. This was resublimed and submitted for analysis.

Analysis.—Calc'd. for $C_5HN_3$: C, 58.25; H, 0.97; N, 40.78. Found: C, 59.04; H, 1.24; N, 41.28, 41.38.

D. Chlorotricyanoethylene

Chlorine was added to a solution of 1.03 g. (0.01 mole) of tricyanoethylene and 10 ml. of benzene. This solution was then treated with a solution of 0.90 g. (0.0091 mole) of triethylamine in 10 ml. of benzene dropwise with stirring. The solution was allowed to stand 15 minutes, filtered, and passed over a column of acid alumina (12 g.). The product collected in the first 50 ml. of elutriate was obtained by evaporation of the benzene and was sublimed to yield 0.90 g. of chlorotricyanoethylene (66%). A portion was resublimed at atmospheric pressure at $120°$ C. for analysis, M.P. $69-70°$ C.

Analysis.—Calc'd. for $C_5N_3Cl$: C, 43.64; N, 30.55; Cl, 25.82. Found: C, 44.42, 44.87; N, 30.66, 30.86; Cl, 26.48, 25.73.

EXAMPLE II

Reaction of chlorotricyanoethylene with N-methylaniline

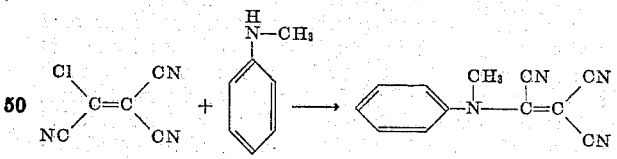

To a solution of 1.35 g. (0.01 mole) of chlorotricyanoethylene in 30 ml. of ether there were added 2.07 g. of N-methylaniline dropwise with stirring. Upon addition of a drop of N-methylaniline, a blue color formed, but this disappeared almost instantaneously. The solution was filtered to remove the N-methylaniline hydrochloride, and the ethereal solution was concentrated to dryness and recrystallized several times from benzene. The yield was 1.25 g., M.P. $124-126°$ C., of yellow-colored product.

Analysis.—Calc'd. for $C_{12}H_8N_4$: C, 69.23; H, 3.85; N, 26.92. Found: C, 68.86; H, 3.93; N, 26.78.

EXAMPLE III

A. Tetramethylammonium salt of tricyanovinyl alcohol

A mixture of 25.6 g. (0.2 mole) of tetracyanoethylene and 100 ml. of water was heated to reflux and stirred vigorously until all of the solid had gone into solution. Twenty-two grams of tetramethylammonium chloride were dissolved directly into the reaction mixture, and the resulting solution was filtered and cooled. The crystalline precipitate which formed was collected on a filter and washed with a small amount of water and then alcohol. There was obtained 30.6 g. (80% yield) of the tetramethylammonium salt of tricyanovinyl alcohol as very long, light yellow needles, M.P. 210–211° C.

B. *Chlorotricyanoethylene from salts of tricyanovinyl alcohol*

A mixture of 10.4 g. of the tetramethylammonium salt of tricyanovinyl alcohol, 11.0 g. of phosphorous pentachloride and 50 ml. of methylene chloride was stirred and heated under reflux for 30 minutes. The mixture was filtered and the methylene chloride solution was concentrated under reduced pressure. The tarry residue was placed in a sublimer and tricyanovinyl chloride was sublimed out at 60° C. under reduced pressure to yield 0.30 g. of chlorotricyanoethylene, M.P. 71–72°.

The chlorotricyanoethylene as obtained above reacted with dimethylaniline to give N,N-dimethyl-p-tricyanovinylaniline, a bright red dye.

In place of phosphorous pentachloride in the preceding example, other reagents for replacement of hydroxyl by chlorine can be used. These include phosphorus oxychloride, thinoyl chloride, oxalyl chloride and benzotrichloride.

Chlorotricyanoethylene (optionally called tricyanovinyl chloride) has the structural formula

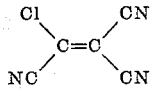

As shown in Example I, the compound is available by chlorination of tricyanoethylene followed by dehydrochlorination. The addition of chlorine to the tricyanoethylene in substantially molar ratios takes place readily in solution, e.g., with a hydrocarbon or chlorinated hydrocarbon solvent at temperatures of generally 25–75° C. The 1,2-dichloro-1,1,2-tricyanoethane loses hydrogen chloride in the presence of an acid acceptor.

Preferred as dehydrochlorinating agents are tertiary lower alkylamines such as for instance trimethylamine, triethylamine, ethyldiisopropylamine and ethyldicyclohexylamine. Pyridine and quinoline can also be used. The dehydrochlorination agents are employed in equimolar ratios. The reaction takes place readily at room temperature. The acid acceptor or dehydrochlorinating agent is generally employed in a molar ratio and in a mutual solvent such as hydrocarbon, ether, or halogenated hydrocarbon. The solvent is non-reactive and one that can be removed from the desired product or employed as a crystallization medium for the chlorotricyanoethylene.

The tricyanoethylene employed in the above reaction is obtained by the dehydrobromination of 1-bromo-1,1,2-tricyanoethane in the general manner described for the dehydrochlorination. The bromo derivative in turn is available by the substitution bromination of tertiary hydrogen in 1,1,2-tricyanoethane wherein molar amounts of the reactants are employed in an aqueous medium at temperatures of preferably 0–50° C.

The chlorotricyanoethylene is a relatively stable compound, capable of being sublimed. It is soluble in organic solvents to an appreciable extent. It reacts with aromatic amines as shown in Example II. It is surprising that the chlorine, which can be viewed formally as of the vinyl type, is reactive. Reaction of chlorotricyanoethylene with hydrogen bearing amines gives N-tricyanovinyl compounds of the type described in U.S. 2,762,832 wherein they were obtained by reaction of the amine with tetracyanoethylene. The N-tricyanovinyl derivatives of aromatic amines are generally bright yellow in color and are useful as dyes for textiles. When a tertiary aromatic amine is employed, nuclear tricyanovinyl substituent is obtained. The latter are generally deep red in color and likewise useful as dyes as shown in U.S. 2,762,810. For example, chlorotricyanoethylene reacted with dimethylaniline to give p-tricyanovinyl dimethylaniline in substantially quantitative yield. Chlorotricyanoethylene when dissolved in tetrahydrofuran reacted with water at room temperature to give 1,1,2,3,3-pentacyanopropenide ion, further described in U.S. 2,766,243.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Chlorotricyanoethylene.
2. A process comprising adding chlorine to tricyanoethylene and treating the resulting product with a tertiary alkylamine to yield chlorotricyanoethylene.
3. Process for preparing chlorotricyanoethylene which comprises adding chlorine to tricyanoethylene in substantially molar ratios and in a reaction medium selected from the class consisting of hydrocarbon and chlorinated hydrocarbon solvents and treating the resulting solution with a tertiary lower alkylamine.
4. Process of claim 2 wherein said tricyanoethylene is prepared from 1,1,2-tricyanoethane by adding bromine thereto in aqueous medium and dehydrobrominating the resulting 1-bromo-1,1,2-tricyanoethane with a tertiary alkylamine.

References Cited in the file of this patent
UNITED STATES PATENTS 2,465,318   Seymour _____ Mar. 22, 1949

OTHER REFERENCES

Richter: "Organic Chemistry," volume 1, 1947, page 342.